(12) United States Patent
Li

(10) Patent No.: US 8,926,720 B2
(45) Date of Patent: Jan. 6, 2015

(54) CONTROL SYSTEM AND METHOD FOR A FUEL PROCESSOR

(75) Inventor: Xuantian Li, Vancouver (CA)

(73) Assignee: Westport Power Inc., Vancouver, BC (CA)

( * ) Notice: Subject to any disclaimer, the term of this patent is extended or adjusted under 35 U.S.C. 154(b) by 1487 days.

(21) Appl. No.: 12/112,769

(22) Filed: Apr. 30, 2008

(65) Prior Publication Data

US 2008/0271785 A1 Nov. 6, 2008

Related U.S. Application Data

(60) Provisional application No. 60/915,118, filed on May 1, 2007.

(51) Int. Cl.
*C10J 3/46* (2006.01)

(52) U.S. Cl.
USPC ........... 48/197 R; 48/61; 48/127.9; 48/127.1; 422/105; 422/107; 422/108; 422/110; 422/112; 422/116; 429/17; 429/19; 429/22; 429/25

(58) Field of Classification Search
USPC .................. 422/625, 105, 107–108, 110–112
See application file for complete search history.

(56) References Cited

U.S. PATENT DOCUMENTS

| | | |
|---|---|---|
| 6,267,792 B1 | 7/2001 | Nagamiya et al. |
| 6,391,484 B1 | 5/2002 | Keskula et al. |
| 6,851,398 B2 | 2/2005 | Taylor, III et al. |
| 6,852,307 B1 | 2/2005 | Kuipers et al. |
| 2002/0062641 A1 | 5/2002 | Shiino et al. |
| 2003/0101713 A1 | 6/2003 | Dalla Betta et al. |
| 2005/0193724 A1 | 9/2005 | Webb et al. |
| 2006/0096175 A1 | 5/2006 | Russell et al. |
| 2006/0225350 A1 | 10/2006 | Spallone et al. |
| 2007/0028602 A1 | 2/2007 | Dalla Betta et al. |
| 2007/0151232 A1* | 7/2007 | Dalla Betta et al. ............ 60/286 |
| 2007/0180769 A1 | 8/2007 | Bonadies et al. |

OTHER PUBLICATIONS

Kimura et al., "A feedback/feedforward regulation for load-accommodation and its application to control of reformer for fuel cell vehicle", SICE Annual Conference in Fukui [Online], Aug. 4-6, 2003, pp. 1028-1034.

* cited by examiner

*Primary Examiner* — Kaity V. Handal
(74) *Attorney, Agent, or Firm* — Corridor Law Group, P.C.

(57) ABSTRACT

The mass flow rate of a first reactant stream supplied to a fuel processor is controlled based on a combined feed-forward and feedback control regime. The method is particularly applicable for actively controlling the fuel supply to a fuel processor in a system comprising a combustion engine, in which the fuel processor is fluidly connected to receive at least a portion of an engine exhaust stream from the engine. In embodiments of the system and method, the supply of fuel is controlled based on three mass flow factors.

11 Claims, 3 Drawing Sheets

CONTROL SYSTEM AND METHOD FOR A FUEL PROCESSOR

CROSS-REFERENCE TO RELATED APPLICATION(S)

This application is related to and claims priority benefits from U.S. Provisional Patent Application Ser. No. 60/915,118 filed May 1, 2007, entitled "Control System And Method For A Syngas Generator", which is hereby incorporated by reference in its entirety.

FIELD OF THE INVENTION

The present invention relates to a method of controlling a fuel processor, in particular a syngas generator where supply of an oxidant reactant is passively controlled and supply of a fuel reactant is actively controlled. More particularly the invention relates to the control of the mass flow of a fuel reactant to a syngas generator in an engine system.

BACKGROUND OF THE INVENTION

A syngas generator is a device that can convert a fuel reactant and an oxidant reactant into a gas stream containing hydrogen ($H_2$) and carbon monoxide (CO), commonly referred to as syngas. The reactant mass flow rates are controlled to vary the composition, for example the equivalence ratio or oxygen-to-carbon (O/C) ratio, of the reactant mixture supplied to the syngas generator. The O/C ratio affects various factors during the operation of the syngas generator, for example, operating temperature, carbon (soot and coke) formation and the composition of the product syngas stream.

In some syngas generator applications, an oxidant reactant is supplied with passive flow control, while supply of a fuel reactant is actively controlled by a variable flow control device. The flow rate of the oxidant reactant that is supplied via the passive control device can vary, but the variation is essentially uncontrolled. This approach, with active control of only one reactant, offers the advantages of variable flow control, rapid response times, reduced system complexity and reduced cost. For example, an oxidant can be supplied via a fixed orifice device, while a fuel is metered by a variable speed fixed displacement pump controlled by a controller and optionally corresponding sensors. An example of a syngas generator system is described in U.S. Patent Application Publication No. 2006/0048502 A1 published Mar. 9, 2006 (Ser. No. 11/193,930 filed Jul. 29, 2005), entitled "Integrated System For Reducing Fuel Consumption And Emissions In An Internal Combustion Engine".

In load-following or transient applications, the requirement for a product syngas stream and/or the supply of an oxidant reactant to a syngas generator can vary rapidly. For example, in an exhaust after-treatment system of a diesel powered vehicle, a syngas generator can be employed to produce a product syngas stream to regenerate components of the exhaust after-treatment system, while a portion of the exhaust stream from the diesel engine can be used as the oxidant reactant stream for the syngas generator. In this example application, the temperature, pressure and composition of the exhaust stream from the diesel engine, and the requirement for syngas to regenerate the exhaust after-treatment system, can vary rapidly. A control method capable of responding rapidly to such changes is required in order to maintain the appropriate supply of oxidant and fuel reactants to provide that parameters, such as, for example, the equivalence ratio or oxygen-to-carbon (O/C) ratio are kept within a desired range during operation of the syngas generator. This is to reduce or prevent undesirable effects such as excess carbon formation, excess fuel consumption, and excessive temperatures, during the operation of the syngas generator.

One approach to controlling the supply of a fuel reactant to a syngas generator is based on a closed-loop, or feedback only, control regime. For example, the flow rate of fuel reactant supplied to the syngas generator can be controlled and dynamically adjusted in response to signals from sensors located in the product syngas stream. A shortcoming of this approach is slow response time, for example, due to the thermal mass of the syngas generator and delays caused by the sensors. Another approach is based on an open-loop, or feed-forward only, control regime, using modeled or pre-determined information to anticipate the requirements of the syngas generator. An example of a feed-forward control regime in an exhaust after-treatment system of a diesel engine is one in which certain operating parameters of the engine are used to determine the requirement for fuel reactant supplied to the syngas generator (for example, via a look-up table). A shortcoming of this approach is that the desired accuracy may not be achieved, and the control system may not respond appropriately to an unusual operating situation.

The present control regime for controlling reactant supply to a syngas generator overcomes at least some of the shortcomings of these prior approaches and offers additional advantages. An advantage of the present approach is that the control regime is capable of responding rapidly, and with a reduced variance from the desired reactant supply value, during steady-state and transient conditions in load-following applications.

SUMMARY OF THE INVENTION

In embodiments of the present method, the desired mass flow rate of a first reactant stream to be supplied to a fuel processor is periodically determined during operation of the fuel processor. The mass flow rate value takes into account first, second and third mass flow factors. The first mass flow factor is determined based on at least one parameter related to a second reactant stream supplied to the fuel processor at a steady-state condition. The second mass flow factor is determined based on a rate of change to at least one second reactant stream parameter. In addition the second mass flow factor can optionally be based on the current second reactant stream parameter(s), as well as the rate of change to the parameter(s). The third mass flow factor is determined based on at least one process parameter of the fuel processor. In some embodiments the first reactant stream is a fuel stream.

The fuel processor can be a syngas generator that is operated to produce a syngas stream.

In preferred embodiments the supply of the second reactant stream to the fuel processor is passively controlled, and the first reactant stream is metered to the fuel processor via a variable flow control device.

Determination of the first mass flow factor can comprise monitoring a temperature, pressure and/or composition of the second reactant stream and obtaining a predetermined first mass flow factor for the particular value of the monitored parameter(s).

Determination of the second mass flow factor can comprise monitoring the rate of change of the temperature, pressure or composition of the second reactant stream. Optionally the second mass flow factor can be determined based on the rate of change of at least one control variable of the source of the second reactant stream.

Determination of the third mass flow factor can comprise monitoring at least one process parameter of the fuel processor. This process parameter can comprise a temperature within the fuel processor, a pressure within the fuel processor, the composition of the fuel processor product stream, the oxygen content of the product stream, and/or a pressure drop across the fuel processor. Alternatively or in addition the process parameter can relate to utilization of the product stream. For example, it can comprise at least one operating parameter from at least one device to which the product stream is directed.

In some embodiments the second reactant stream is an oxidant stream. In some applications the oxidant stream comprises an exhaust stream from a combustion engine. In this case, the first mass flow factor can depend upon at least one operating parameter of the engine. Determination of the first mass flow factor can comprise monitoring at least one operating parameter of the combustion engine and obtaining the predetermined first mass flow factor for the particular value of the monitored engine operating parameter(s). This predetermined first mass flow factor can be obtained, for example, from a look-up table. In engine applications the second mass flow factor can depend upon the rate of change of at least one operating parameter of the engine. Determination of the second mass flow factor can comprise monitoring the rate of change of at least one operating parameter of the combustion engine and obtaining the second mass flow factor based on that rate of change. The engine operating parameter(s) used in determining the first and second mass flow factors can be, for example, the engine speed, torque, the oxygen content of the engine exhaust stream, the temperature of the engine exhaust stream and/or the pressure of the engine exhaust stream.

More specific embodiments relate to a method of controlling the supply of a fuel reactant stream to a syngas generator that is operated to produce a syngas stream. An oxidant reactant stream comprising an engine exhaust stream is supplied from a combustion engine via a passive flow control device with passive control of the flow rate. The desired mass flow rate value for the fuel reactant stream supplied to the syngas generator is periodically determined during operation of the syngas generator. The fuel mass flow rate value takes into account first, second and third mass flow factors. The first mass flow factor is determined based on at least one monitored operating parameter of the engine, as described above. The second mass flow factor is determined based on a monitored rate of change of at least one engine operating parameter. In addition the second mass flow factor can optionally be based on the current engine operating parameter, as well as the rate of change to the parameter. The third mass flow factor is determined based on at least one monitored process parameter of the syngas generator, as described above. Preferably the fuel reactant stream is supplied to the syngas generator at the determined mass flow rate via a variable flow control device.

In embodiments of a system comprising a combustion engine and a fuel processor for producing a hydrogen-containing gas stream, the fuel processor is fluidly connected to receive at least a portion of an engine exhaust stream from the engine via a passive flow control device, so that the flow rate is passively controlled. The system further comprises a control subsystem for actively controlling the supply of a fuel reactant stream to the fuel processor. The control subsystem comprises a variable flow control device and an actuator coupled to adjust the mass flow of the fuel reactant stream to the fuel processor through the variable flow control device. The controller is configured to control the actuator, and the controller is responsive to:

(i) an output signal from at least one sensor that is indicative of at least one operating parameter of the engine;
(ii) an output signal from at least one sensor that is indicative of the rate of change of at least one operating parameter of the engine; and
(iii) an output signal from least one sensor that is indicative of at least one operating parameter of the fuel processor.

The controller is configured to control the actuator to adjust the mass flow rate of the fuel reactant stream supplied to the fuel processor through the variable flow control device based on these output signals The fuel processor can be a syngas generator. In one application the system includes the engine and syngas generator as well as an exhaust after-treatment system that is at least periodically fluidly connected to receive at least a portion of an engine exhaust stream from the engine. The exhaust after-treatment system is also fluidly connected to at least periodically receive a hydrogen-containing gas stream from the syngas generator.

BRIEF DESCRIPTION OF THE DRAWING(S)

DETAILED DESCRIPTION OF PREFERRED EMBODIMENT(S)

In a preferred method for controlling the supply of reactants to a syngas generator, the oxidant reactant supply is passively controlled while a combined feed-forward and feedback control regime is employed to control supply of a fuel reactant during operation of the syngas generator.

Figure 1:
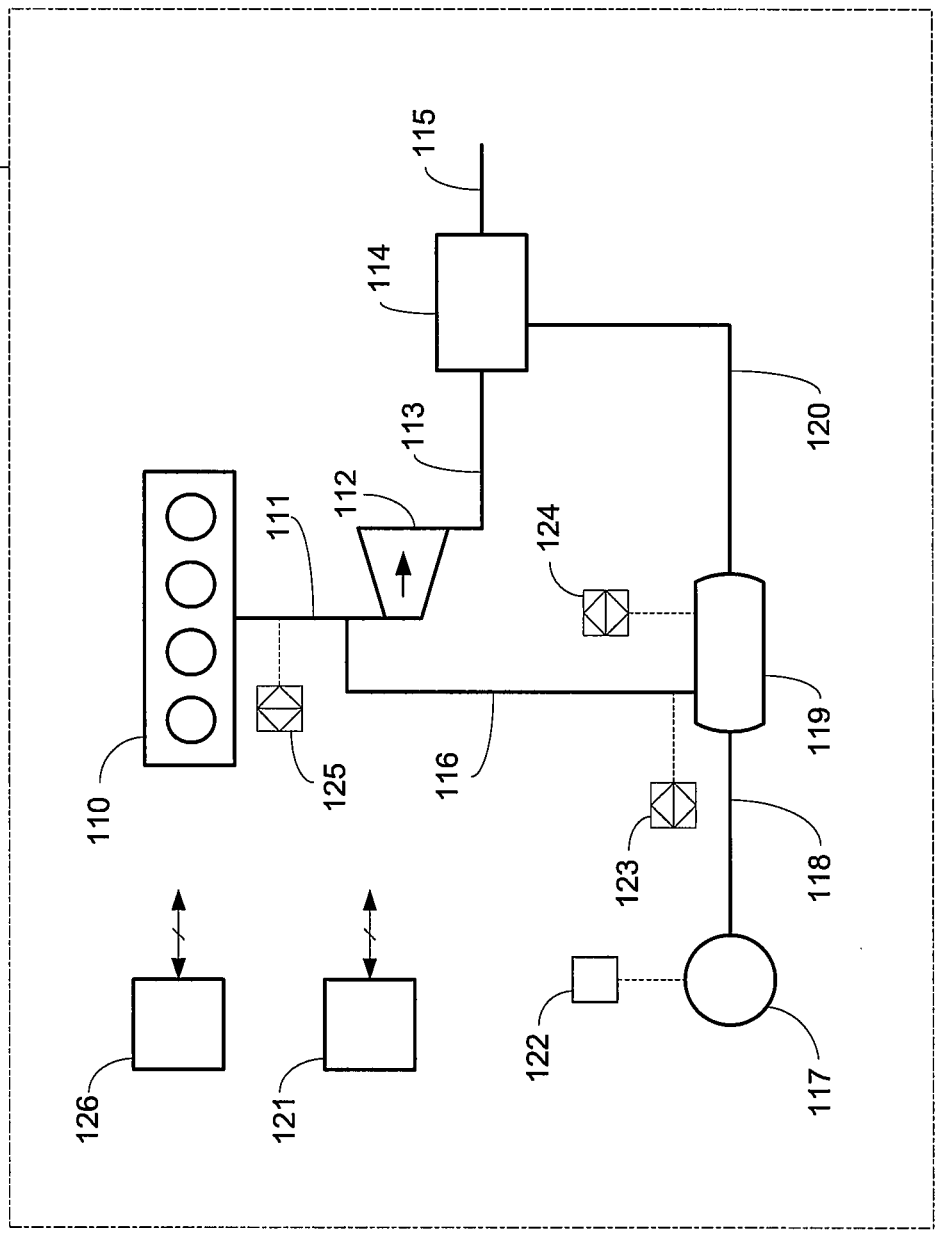
FIG. 1 is a schematic diagram of a combustion engine system comprising an exhaust after-treatment subsystem and a syngas generator.

FIG. 1 is a schematic diagram of a combustion engine system 100 comprising a syngas generator 119 which produces a syngas stream that is employed to regenerate an exhaust after-treatment subsystem 114 which can comprise one or more exhaust after-treatment devices (not shown in FIG. 1). Combustion engine system 100 is an example of a load-following application where the operating condition of engine 110 can be variable and transient, which can create an engine exhaust stream with varying properties, for example, composition (such as regulated emission levels and oxygen concentration) temperature, and pressure. This in turn can create a variable need to regenerate exhaust after-treatment subsystem 114 and a variable requirement for a syngas stream. Furthermore the variation in properties of the exhaust stream from engine 110 increases the complexity of a reactant control regime for syngas generator 119 when at least a portion of the engine exhaust stream is employed as an oxidant reactant in syngas generator 119.

In combustion engine system 100 of FIG. 1, an engine 110 produces an exhaust stream which travels through conduit 111, through an optional turbo-compressor 112, and through conduit 113 to exhaust after-treatment subsystem 114 where the exhaust stream is treated to reduce the level of regulated emissions therein. The treated exhaust stream is then released to the atmosphere via an exhaust conduit 115. Controller 121 receives a signal from, for example, oxygen sensor 125 and an engine speed signal from engine control module 126 to determine the operating condition of engine 110. Controller 121 at least periodically calculates the mass flow of the fuel reactant stream to be supplied to syngas generator 119 based on a programmed algorithm, a feed-forward and feedback control regime, and signals received from various sensors and/or control modules. Controller 121 can be a stand-alone unit or integrated into another controller for example, engine control module 126. A fuel reactant stream (from a fuel source not shown in FIG. 1) is supplied to a metering device 117 which meters the mass flow of the fuel reactant stream through conduit 118 to syngas generator 119. The fuel reactant stream can be from the same source which supplies fuel to engine 110. Metering device 117 is actuated and controlled by actuator 122 which receives a signal at least periodically from controller 121. Metering device 117 can be, for example, a valve or a metering pump which is employed to control the mass flow of the fuel reactant stream supplied to syngas generator 119 in order to provide that parameters such as, for example, equivalence ratio or oxygen-to-carbon (O/C) ratio are kept within a desired range. In the illustrated embodiment, at least a portion of the exhaust stream produced by engine 110 is employed as an oxidant reactant stream supplied to syngas generator 119. The exhaust stream from engine 110 flows through conduit 111 and at least a portion is supplied via conduit 116 to syngas generator 119. The pressure of the oxidant reactant stream is monitored by pressure sensor 123 which sends a signal to controller 121. A passive flow control device such as a critical flow venturi (CFV) (not shown in FIG. 1), that can be located internal to syngas generator 119 passively meters the mass flow of the oxidant reactant stream. Syngas generator 119 converts the mixed fuel and oxidant reactant stream into a product syngas stream. The temperature of syngas generator 119 is monitored by temperature sensor 124 which sends a signal to controller 121. The product syngas stream flows from syngas generator 119 through conduit 120 via an optional valve or valves (not shown in FIG. 1) to exhaust after-treatment subsystem 114 and/or other syngas-consuming devices (not shown in FIG. 1). The syngas stream is at least partially consumed by the exhaust after-treatment subsystem 114 during a regeneration process.

Figure 2:
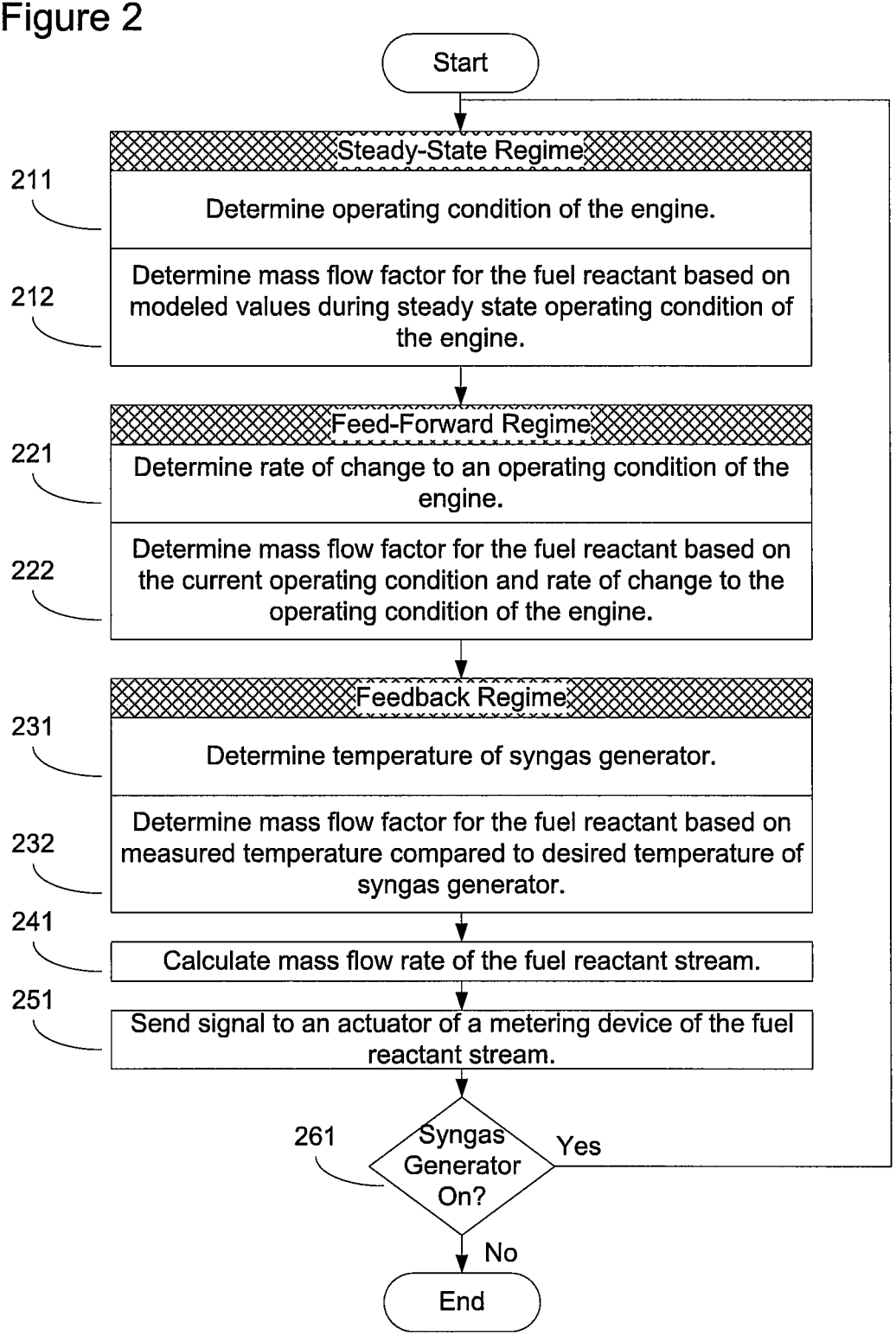
FIG. 2 is a flow chart of a process to calculate a mass flow rate of a fuel reactant stream to be supplied to a syngas generator.

FIG. 2 is a flow chart of a process that can be used to calculate a mass flow of a fuel reactant stream to be supplied to a syngas generator. The flow chart starts with the engine turned on prior to fuel being supplied to the syngas generator, and ends with the controller receiving a signal to shut down the syngas generator. During start-up and operation of the syngas generator, the controller is energized and receives signals indicative of real-time engine-related parameters from at least one engine-related sensor and/or engine control module, for example, oxygen content of the engine exhaust stream, temperature of the engine exhaust stream and/or speed or torque of the engine. In step 211, the controller determines the operating condition of the engine from the parameters received and in step 212 determines a mass flow factor (steady-state) for the fuel reactant based on programmed (pre-determined) values. The programmed values have been established through prior testing and modeling of an engine/syngas generator system during operation at a steady-state condition, yielding a steady-state regime. A "mass flow factor" can be at least one or a combination of the following: an actual or calculated mass flow rate, a modifier, or an element or factor in an equation used to determine the desired mass flow rate. In step 221 the controller continues to monitor engine-related parameters from at least one engine-related sensor and/or engine control module, determines the current operating condition of the engine and the rate of change to the operating condition of the engine and in step 222 determines the mass flow factors (feed-forward) for the fuel reactant supply for a feed-forward regime. In step 231 the controller receives signals indicative of real-time process or product-related parameters from the syngas production process, for example, temperature of the syngas generator (as illustrated in FIG. 2) and/or oxygen content of the product syngas stream. Alternatively or in addition, the controller can receive signals related to syngas utilization, for example, that are indicative of real-time parameters from devices or systems that are consuming or utilizing syngas, for example, an exhaust after-treatment subsystem or its components. In step 232, the product-related parameters are used to determine a mass flow factor (feedback) for the fuel reactant supply, providing a feedback regime. In step 241, the controller calculates the instantaneous desired mass flow rate of the fuel reactant to be supplied to the syngas generator based on the mass flow factors of the steady-state, feed-forward and feedback regime, for example, as illustrated in equation (1).

$$m_F = m_{steady\text{-}state}(1 + f_{feed\text{-}forward} + f_{feedback}) \quad (1)$$

where:

$m_F$ = instantaneous mass flow rate of a fuel reactant stream supplied to a syngas generator, $m_{steady\text{-}state}$ = mass flow rate of a fuel reactant stream at steady-state operating condition of the engine, $f_{feed\text{-}forward}$ = mass flow factor of a fuel reactant stream for a determined current and rate of change to an operating condition of the engine, and $f_{feedback}$ = mass flow factor of a fuel reactant stream based on a measured temperature compared to a desired temperature of the syngas generator.

In step 251, the controller sends a signal to an actuator of a metering device used to adjust the mass flow of the fuel reactant stream. In step 261, the controller checks if the syngas generator should be operational based on signals received from, for example, the engine control module. If the controller determines the syngas generator should be shut down, the process ends. If the controller determines the syngas generator should be in operation, the process repeats from the start. The process steps shown in FIG. 2 can occur sequentially or in a different order than shown.

Alternatively, equation (1) can be represented by different formulae depending on the nature of the mass flow factors used, for example, it can be as illustrated in equation (2). Regardless of the exact equation or algorithm used, the principle in the present approach is that mass flow factors based on steady-state, feed-forward and feedback are determined and taken into account in determining the fuel reactant stream mass flow rate, $m_F$.

$$m_F = (m_{steady\text{-}state}) * (f_{feed\text{-}forward}) * (f_{feedback}) \quad (2)$$

In other embodiments the operation of the syngas generator can be further divided, for example, into a plurality of operating phases and modes of operation, with one or more correction factors to equations (1) or (2) to be applied to each phase and mode of operation. Table 1 provides an example of correction factors to be applied to equations (1) or (2) for various potential phases and modes of operation during operation of the syngas generator. The controller can determine which operating phase and mode of operation the syngas generator is operating in based on signals from the various sensors and controllers. The controller can then apply the appropriate programmed correction factor.

TABLE 1

Correction factors to be applied to equations (1) or (2)

| Operating Phase | Mode of Operation | Correction Factor to Equations (1) or (2) |
|---|---|---|
| Start-Up | Lean | A |
| Start-Up | Rich | B |
| Normal | Lean | C |
| Normal | Rich | 1 |

An example of a mass flow rate calculation using equation (1) with a correction factor is illustrated in equation (3). Equation (3) represents operating a syngas generator during a normal operating phase in a lean mode of operation.

$$m_F = m_{steady\text{-}state}(1 + f_{feed\text{-}forward} + f_{feedback}) * (c) \quad (3)$$

where:
$c$=correction factor applied during a normal operating phase in a lean mode of operation In the embodiments discussed so far in this section, the supply of fuel reactant is actively controlled using the described control regime while the supply of oxidant reactant to the syngas generator is preferably passively controlled. In some fuel processor or syngas generator applications it can be switched the other way around.

Figure 3:
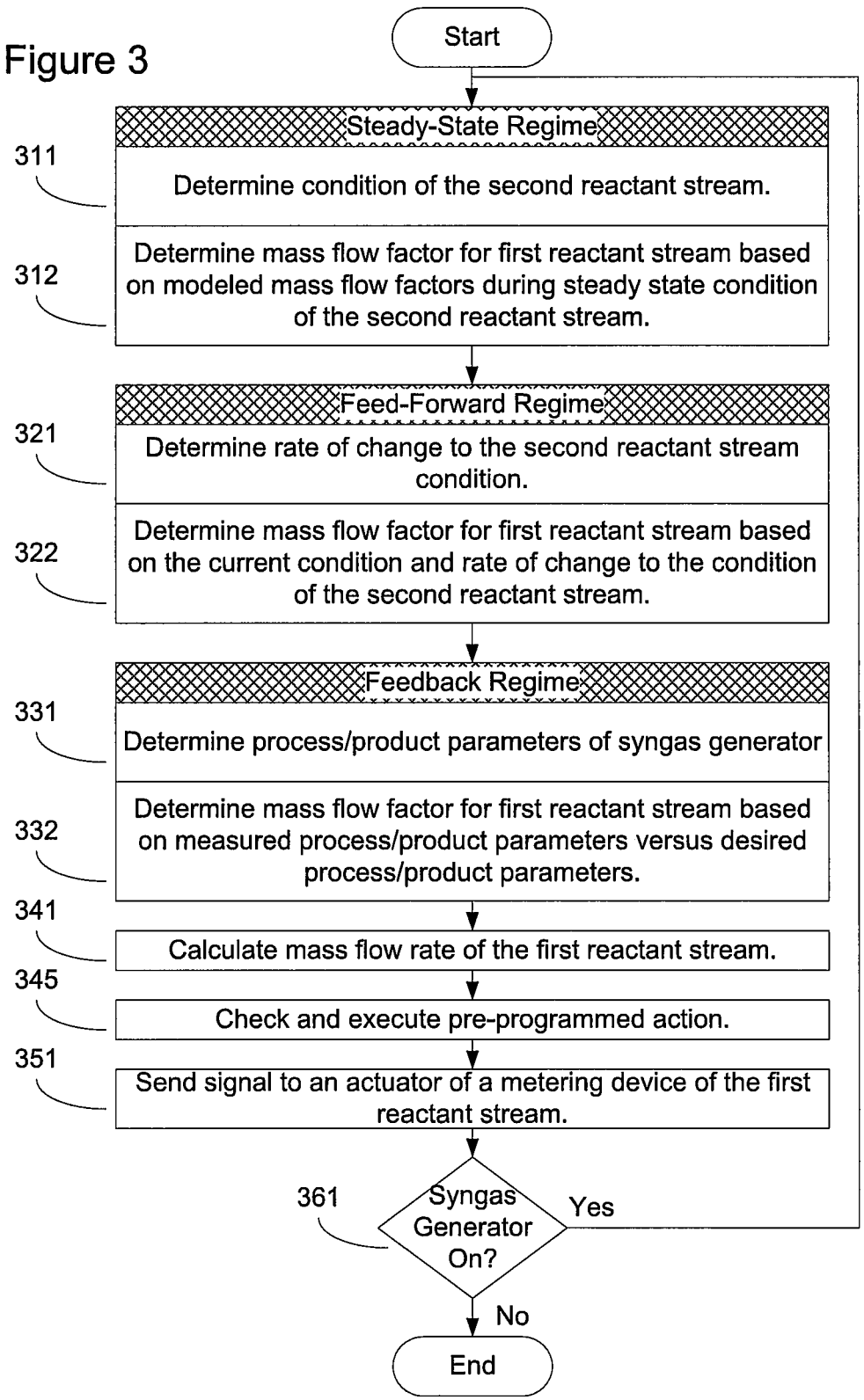
FIG. 3 is a flow chart of a process to calculate a mass flow rate of a reactant stream to be supplied to a syngas generator.

FIG. 3 is a flow chart of a process that can be used to calculate the mass flow of a first reactant stream to be supplied to a syngas generator with a feed-forward regime from a second reactant stream and a feedback regime from a product syngas stream. The flow chart starts with the controller energized prior to a first reactant stream being supplied to the syngas generator, and ends with the controller receiving a signal to shut down the syngas generator. During start-up and operation of the syngas generator, the controller is energized and in step 311 it receives at least one signal related to a second reactant stream for example, second reactant stream content, pressure and/or temperature. In step 312, based on the values of the second reactant stream parameter the controller determines a mass flow factor for the first reactant stream during a steady-state regime of the second reactant stream. In step 321, the controller continues to monitor one or more signals related to the second reactant stream, and uses them to determine the current state and rate of change to the state of the second reactant stream and in step 322 determines an anticipated change factor or a feed-forward regime for the mass flow factor for the first reactant stream. In step 331, the controller receives signals related to the syngas generator process and/or product syngas stream, compares the received values to pre-determined desired values which are pre-programmed into the controller and in step 332, determines a mass flow factor for the first reactant stream, utilizing a feedback regime. In step 341, the controller calculates the mass flow rate for the first reactant stream based on the steady-state, feed-forward and feedback mass flow factors for example, as illustrated in equation (1) or (2).

In preferred embodiments, the calculated mass flow rate can be checked against one or more criteria before the controller sends a signal to an actuator of a metering device to adjust the mass flow rate of the first reactant stream. Such a checking step can be incorporated into the embodiments illustrated in FIG. 2 or 3, or into other embodiments of the method. For example, in step 345 the calculated mass flow rate can be checked against one or more of the following criteria and, in response, one or more pre-programmed action(s) can be executed as required:

(i) Non-negativity check: to provide, for example, that the calculated mass flow rate is not less than zero for each state during fuel processor startup, normal operation and shutdown;

(ii) No numerical singularity: for example, to avoid situations in the control calculations that could create a numerical singularity, such as division by zero, this check could provide that the denominator is greater than a certain small positive number;

(iii) Operating regime check: for example, to provide that the fuel processor is operating in the intended regime (for example, lean or rich) based on the system state and product requirement;

(iv) Pump flow upper limit check: for example, if the metering device is a pump, this check could provide that the final output value for the fuel mass flow rate determined by the controller is within the pump flow limit;

(v) Carbon formation check: for example, to provide that the oxidant-to-fuel ratio is within desirable limits so as to mitigate the risk of carbon formation;

(vi) Safety check: for example, to stop fuel flow if an operating temperature exceeds a pre-determined upper limit;

(vii) Fault markers: for example, if a signal from one or more sensor exceeds a predetermined value which is programmed into the controller a fault signal, for example a predetermined code, is assigned and recorded for the event by the controller. This can assist in detecting fault events and/or determining root causes of problems and/or failure mechanisms.

There are various options that can result if the calculated mass flow rate fails one or more checks. For example, in some embodiments if the calculated mass flow rate exceeds a threshold value, the controller can limit or "clamp" the mass flow rate and cause the actuator to be set to deliver the maximum permissible mass flow rather than the calculated mass flow. Similarly the controller can cause the actuator to deliver a certain minimum permissible mass flow in the event that the calculated value is below a threshold value, or to override or adjust the calculated mass flow rate to cause the oxygen-carbon ratio to remain with a desired range. In some situations a fault signal can be the result and/or the system can be shutdown.

In step 351, the controller sends a signal to an actuator of a metering device of the first reactant stream. In step 361, the controller checks if the syngas generator should be operational based on signals received from, for example, the engine control module. If the controller determines the syngas generator should be shut down, the process ends. If the controller determines the syngas generator should be in operation, the process repeats from the start. The process steps shown in FIG. 3 can occur sequentially or in a different order than shown.

The above description has focused on the control of reactant supply to a syngas generator operating on a reactant mixture comprising a fuel and a combustion engine exhaust gas stream. However, the present reactant supply control strategy could offer advantages in other types of fuel processors, reformers or reactors operating on different types of reactant mixtures. For example, the fuel processor could be of various types, such as a catalytic partial oxidizer, a non-catalytic partial oxidizer, and/or an autothermal reformer. The fuel reactant can be diesel, fuel oil, gasoline, methanol, ethanol, kerosene, natural gas, propane, liquefied petroleum gas (LPG) or other suitable hydrocarbon fuel, oxygenated hydrocarbon fuel or alcohol. The oxidant reactant can be supplied from a source in addition to or other than an exhaust stream of a combustion engine and can at least partially comprise air, oxygen, water or steam. For example, it could comprise an exhaust stream from a fuel cell or air supplied from the surrounding atmosphere.

The hydrogen-containing gas stream or syngas generated by the fuel processor can be used for many different end-use applications. For example, it can be used for heating or regenerating engine exhaust gas after-treatment devices or it can be directed to other hydrogen-consuming devices such as fuel cells and/or a combustion engine. Although the methods described herein are particularly suitable for control of reactant supply to fuel processors in engine system applications, they can be applicable in other applications.

Both reactant streams supplied to the fuel processor or syngas generator can be actively controlled, rather than one being passively controlled as described above. Furthermore, the control device of the reactant stream can be located internal or external to the fuel processor.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method of controlling the mass flow rate of a fuel stream supplied to a fuel processor, the method comprising:
   (a) determining a first mass flow factor of said fuel stream for said fuel processor based on at least one parameter related to an oxidant stream supplied to said fuel processor at a steady-state condition, said oxidant stream comprising an exhaust stream from a combustion engine;
   (b) determining a second mass flow factor of said fuel stream for said fuel processor based on a rate of change to at least one parameter related to said oxidant stream supplied to said fuel processor, wherein said second mass flow factor depends upon the rate of change of at least one operating parameter of said engine, and monitoring the rate of change of at least one operating parameter of said combustion engine and obtaining the second mass flow factor based on the rate of change of the one or more monitored operating parameters;
   (c) determining a third mass flow factor of said fuel stream for said fuel processor based on at least one process parameter of said fuel processor;
   (d) determining a calculated mass flow rate taking into account said first, second and third mass flow factors;
   (e) determining whether said calculated mass flow rate is within a permissible range; and
   (f) repeating steps (a) through (e) at least periodically during operation of said fuel processor.

2. The method of claim 1 wherein said fuel processor is a syngas generator operated to produce a syngas stream.

3. The method of claim 1 wherein step (a) comprises monitoring at least one of the temperature, pressure or composition of said oxidant stream and obtaining a predetermined first mass flow factor for the particular value of the one or more monitored parameters.

4. The method of claim 1 wherein said step (c) comprises monitoring at least one process parameter of said fuel processor and said monitored process parameter comprises at least one of: a temperature within said fuel processor, a pressure within said fuel processor, the composition of a product stream from said fuel processor, the oxygen content of a product stream from said fuel processor, or a pressure drop across said fuel processor.

5. The method of claim 1 wherein said step (c) comprises monitoring at least one process parameter of said fuel processor and said at least one monitored process parameter relates to utilization of a product stream from said fuel processor and comprises an operating parameter from at least one device to which said product stream is directed.

6. The method of claim 1 wherein, if said calculated mass flow rate is not within said permissible range, the method further comprises adjusting said calculated mass flow rate and supplying said fuel stream to said fuel processor at said adjusted calculated mass flow rate.

7. The method of claim 1 wherein, if said calculated mass flow rate is not within said permissible range, a fault signal is generated.

8. The method of claim 1 wherein step (e) comprises checking that said fuel processor is operating in an intended regime, or that an oxidant to fuel ratio is within limits to reduce carbon formation.

9. The method of claim 1 wherein said first mass flow factor depends upon at least one operating parameter of said combustion engine and said step (a) comprises monitoring at least one operating parameter of said combustion engine and obtaining the predetermined first mass flow factor for the particular value of the one or more monitored operating parameters, said operating parameter of said combustion engine comprising at least one of the engine speed, torque, the oxygen content of the engine exhaust stream, the temperature of the engine exhaust stream or the pressure of the engine exhaust stream.

10. The method of claim 1 wherein said operating parameter of said combustion engine comprises at least one of the engine speed, torque, the oxygen content of the engine exhaust stream, the temperature of the engine exhaust stream or the pressure of the engine exhaust stream.

11. The method of claim 1 wherein step (b) comprises determining a second mass flow factor of said fuel stream for said fuel processor based on a current condition of, and rate of change to, said oxidant stream parameter.

* * * * *